United States Patent [19]
Annis et al.

[11] 3,734,251
[45] May 22, 1973

[54] HYDRODYNAMIC UNIT WITH MECHANICAL DRIVE CLUTCH

[75] Inventors: Robert E. Annis, Howell; Forrest R. Cheek, Detroit, both of Mich.

[73] Assignee: General Motors Corporation, Detroit, Mich.

[22] Filed: Nov. 18, 1971

[21] Appl. No.: 200,007

[52] U.S. Cl..................192/3.3, 192/41 R, 192/56 F, 192/86
[51] Int. Cl...............................................F16d 39/00
[58] Field of Search ...............192/56 F, 3.29, 3.3, 192/3.33

[56] References Cited
UNITED STATES PATENTS

| | | | |
|---|---|---|---|
| 3,239,037 | 3/1966 | Crosswhite et al. | 192/3.33 X |
| 3,253,684 | 5/1966 | Maurice | 192/3.3 |
| 3,132,530 | 5/1964 | Brise | 192/3.33 X |
| 3,228,503 | 1/1966 | Maurice | 192/3.33 X |
| 3,410,378 | 11/1968 | Maurice | 192/3.33 |
| 3,415,345 | 12/1968 | Cadiou | 192/3.33 |

*Primary Examiner*—Benjamin W. Wyche
*Attorney*—W. E. Finken et al.

[57] ABSTRACT

This hydrodynamic unit has a friction clutch that is selectively engageable to establish a mechanical power path through the unit to improve power transmission efficiency under predetermined operating conditions. A clutch control chamber is automatically hydraulically connected to the torus chamber of the unit by special valve means to reduce clutch capacity to a point where the clutch does not transmit appreciable torque in response to the transition from an engine drive condition to an overrun condition. With clutch capacity so reduced the backlash in the drive unit is effectively dissipated by the fluid in the unit and is not transmitted mechanically to the engine.

5 Claims, 3 Drawing Figures

Patented May 22, 1973

3,734,251

INVENTORS
Robert E. Annis, &
BY Forrest R. Cheek

Charles R. White
ATTORNEY

HYDRODYNAMIC UNIT WITH MECHANICAL DRIVE CLUTCH

This invention relates to a hydrodynamic unit having a selectively engageable clutch for establishing a mechanical power path from an input to an output through the unit and which automatically disengages in response to a reversal in power flow into the unit such as the power flow from the output to the input.

Selectively engageable friction drive clutches have been employed in converter and coupling units of vehicle transmissions to provide a mechanical drive connection between the input and output of the unit under predetermined operating conditions to reduce unit slip losses and thereby improve transmission operating efficiency. When cruising for example, this friction drive clutch is engaged to remove the slip between the input and output rotor members by mechanically connecting them together. The application and popularity of hydrodynamic units with friction clutches is increasing particularly where increased economy of operation is of prime importance. However, these units when locked or drivingly connected by the friction clutch do not provide for the fluid cushioning and absorption of any shocks or rough operation such as might occur when there is a transition from an engine drive condition to an overrun condition. When this occurs with such a clutch engaged the backlash in the entire drive line is reversed and the resulting mechanical jar or "clunk" is transmitted through the clutch to the engine.

This invention utilizes the reversal of load direction for automatically releasing the clutch, thus uncoupling the mechanical connection from the turbine to the engine so that the hydraulic fluid in the unit can function as a fluid damper to reduce the jar of the backlash.

In the preferred embodiment of this invention a clutch is provided in a hydraulic coupling or converter which has a disk-like pressure plate with an outer friction disk that cooperates with the front cover of the unit to form a clutch control chamber within the torus chamber of the hydrodynamic unit. The pressure plate has a drive pin press fitted therein which extends into an opening formed within the turbine hub. This latter opening is larger in diameter than the pin and is hydraulically connected with the torus chamber. The pin has a fluid passage therein which leads from the clutch chamber into the opening in the turbine hub and cooperates with the opening to form control valve means for the clutch control chamber. When the impeller speed is greater than the speed of the turbine, the pin is moved relative to the turbine hub to a position in which the wall forming the opening closes the passage in the pin to seal the clutch chamber from the torus chamber. Under these conditions the clutch can be selectively engaged and disengaged by the controlled pressure fed into the clutch chamber. When impeller speed is less than that of the turbine the pressure plate and drive pin are relatively moved to a position so that the passage is opened and the pressure in the clutch chamber is hydraulically connected with the torus chamber to cause the reduction in capacity of the clutch. This occurs when there is overrun of the impeller by the turbine so that backlash occurring in the drive line will be dissipated by the fluid unit and will not be transmitted mechanically by the clutch which is, in effect, disengaged.

It is a feature and object of this invention to provide a new and improved friction clutch in a fluid unit which when power flows in a first direction to the unit is selectively engageable to establish a mechanical drive through the unit to improve operating efficiency under predetermined operating conditions and which automatically disengages in response to a reversal of power flow to the unit so that torque is transmitted only by the fluid unit.

Another feature and object of this invention is to provide a new and improved means for automatically releasing a torque converter or fluid coupling clutch when the vehicle goes from a drive to a coast or overrun mode of operation. The reversal of load direction releases the clutch to eliminate the mechanical connection from the turbine to the engine to allow the hydraulic fluid in the converter to function as a fluid dampener.

Another feature and object of this invention is to provide a new and improved valve means within a fluid coupling or torque converter for disengaging the clutch when there is a reversal of drive such as from the drive line to the engine; the fluid in the unit absorbs the shock load as the capacity of the clutch is decreased to a low capacity to eliminate the mechanical transmission of shocks to the input rotor of the unit.

These and other features and objects of the invention will become more apparent from the following detailed description and from the drawing in which.

Figure 1:
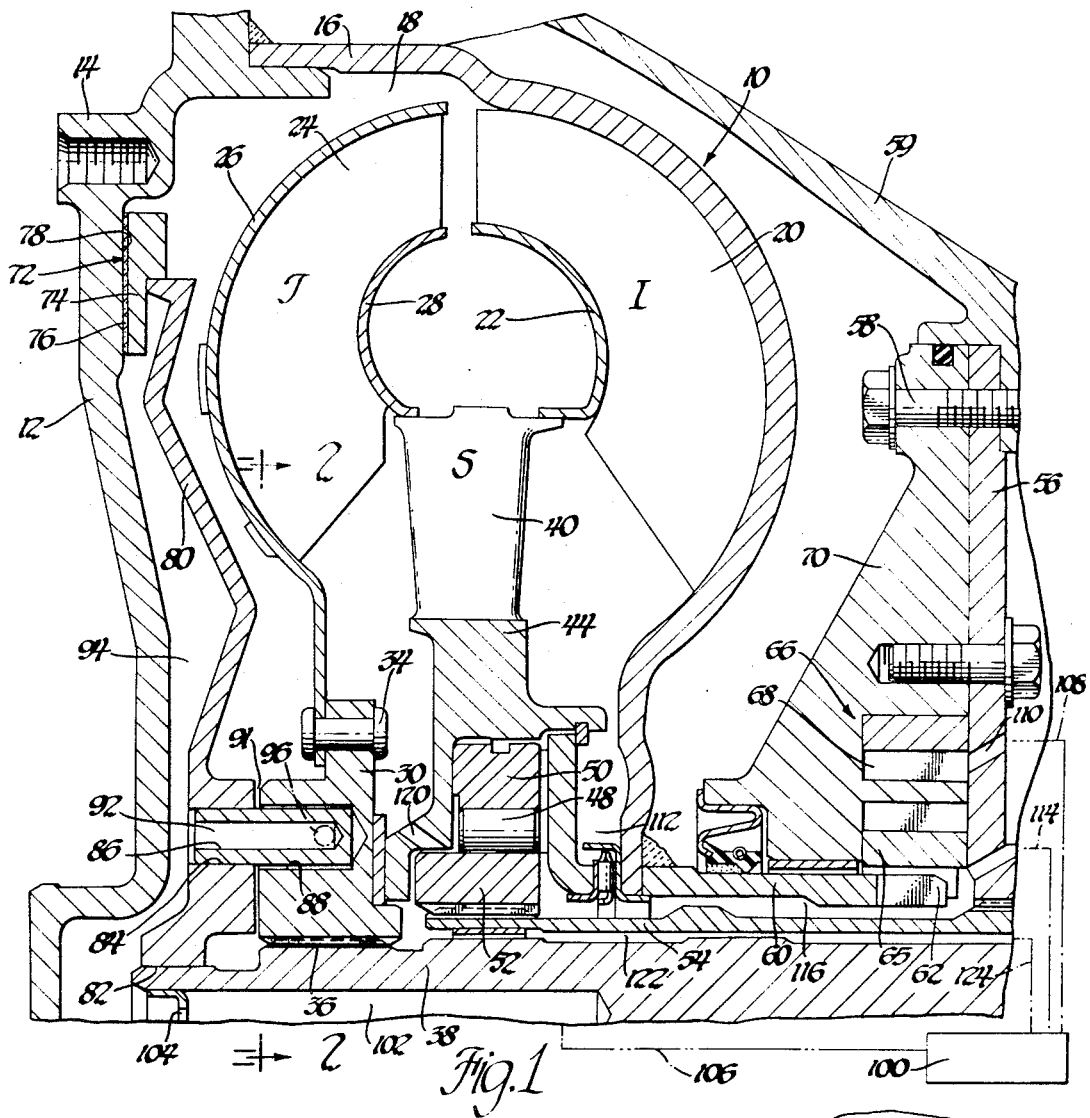
FIG. 1 is a cross-sectional view of an upper portion of a torque converter.

Referring now to FIG. 1, there is shown a hydrodynamic device 10 for driving a gear unit such as shown in U.S. Pat. No. 3,321,056 to Winchell et al. which is operable to provide a plurality of forward drives and a reverse drive. The hydrodynamic device 10 is of the torque converter type and comprise a front cover 12 which is connected by lugs 14 to the engine of a vehicle and which is welded to a rear cover 16 to provide a rotary converter housing that encloses an annular converter chamber or torus 18. A series of vanes 20 is secured to the rear cover 16 and to a radially spaced inner shell 22 to provide an impeller I that rotates with the engine. A second series of vanes 24 secured to outer and inner annular shells 26 and 28 to form a turbine T which is drivingly connected to an annular hub member 30 by connector pins 34 that extend through an inner flange portion of shell 26 and through the hub member. The hub member is splined at 36 to a turbine output shaft 38 which serves as the input to the gear unit. A series of blades 40 which are integral with a hub 44 are disposed between the inner ends of the turbine and impeller blades provides a stator S. The stator is permitted free rotation in the same direction as the impeller by a one-way brake 48 which is disposed between an outer race 50 and an inner race 52. The inner race is splined to a sleeve 54 which is grounded at its rear end to a front bulkhead 56 that is secured by bolts 58 to the stationary housing 59 of the transmission and is located between the torque converter 10 and the gear unit.

The torque converter structure thus far described is conventional and on supply of fluid to the chamber 18 at a suitable charge pressure operates to provide torque multiplication between the impeller I and turbine T to drive the converter output shaft 38 and thus the gear unit. From a stationary vehicle position to a cruising condition the torque multiplication provided by hydrodynamic converter 10 progressively decreases as turbine speed progressively increases and approaches that of the impeller at which time the torque converter then acts as a fluid coupling to continue the drive of the output shaft 38; the one-way brake 34 permitting the stator to free-wheel in the forward direction during coupling operation.

The rear cover 16 is welded at its rear face to a sleeve 60 that is connected at its rear end by a tongue and slot connection 62 to drive an external toothed gear 65 of a conventional internal-external gear type pump 66. The pump's internal tooth gear 68 together with the external tooth gear 65 are mounted in a pump housing 70 which is bolted to the front side of bulkhead 56.

According to the present invention there is provided in the torque converter a fluid pressure operated clutch 72 that is selectively engageable to provide a mechanical drive between the rotary converter front cover 12 and the converter output shaft 38. This mechanical drive is thus in parallel with the normal hydraulic drive to drive the gear unit. Clutch 72 has an annular plate 74 with a friction facing 76 engageable with an annular radially extending face 78 formed on the rear side of the front cover 12 within the rotary converter housing. The friction plate 76 is drivingly connected to an annular disc or pressure plate 80 which has a central opening 82 through which the forward end of the converter output shaft 38 extends. There is no drive connection between opening 82 and shaft 38 so there can be limited relative turning movement between disc 80 and the shaft 38 as will be explained below. Disposed radially outwardly from the central opening 82 in disc 80 is a second opening 84 in which there is rigidly secured a cylindrical drive pin 86 which projects inwardly from disc 80 into an axial cylindrical opening 88 formed in hub member 30.

Figure 2:
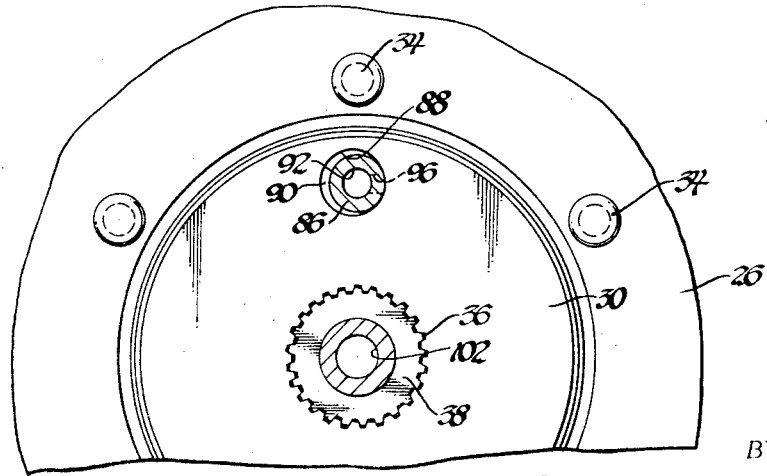
FIG. 2 is a view partly in section taken generally along the lines 2—2 of FIG. 1.
Figure 3:
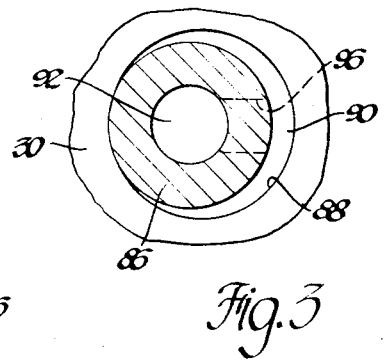
FIG. 3 is a view of a detail of FIG. 2 showing the valve construction of this invention.

As shown best by FIGS. 2 and 3 the opening 88 is slightly larger in diameter than the outer diameter of pin 86 to provide clearance 90 therebetween. When the power flow is from the engine through the clutch 72 to shaft 38 the clearance appears to the left side of the pin as in FIG. 2. On engine overrun when the power flow to the converter is from the shaft 38, the clearance 90 appears on the right side of the pin as shown in FIG. 3. Since there is clearance at 91 between turbine hub 30 and disc 80 the clearance 90 is hydraulically connected at all positions of pin 86 with the torus chamber 18.

As shown the pin is formed with an internal axial passage 92 which opens into the chamber 94 formed between the disc 80 of the clutch 72 and the front cover 12. Further pin 86 has a lateral passage 96 leading from passage 92 which extends through the cylindrical wall thereof. This lateral passage 96 communicates with clearance 90 when pin 86 is in the FIG. 3 position. Thus in FIG. 3 position the passage 92 and 96 provide for the hydraulic communication between annular converter chamber 18 with clutch chamber 94. When pin 86 is in the FIG. 2 position the lateral passage 96 is blocked by the wall of the hub member forming opening 88 so that chamber 18 and chamber 94 are sealed with respect to each other.

Transmission controls 100 are provided for automatically controlling the operation of the gear unit and the clutch 72. As shown clutch chamber 94 is hydraulically connected to the controls through longitudinal passage 102 having a flow control restriction 104 therein and through line 106 which connects passage 102 with the controls. The pump 66 supplies the controls 100 with pressure oil through line 108 that connects the pump discharge port 110 with the controls. Regulated pressure from the controls is fed into the converter inlet 112 through line 114 and connecting passage 116. The converter discharges oil through port 120 to passage 122 formed between the shaft 54 and the turbine shaft 38 and through passage 124 back to a sump in the controls 100 via a cooler.

Assuming that the converter is a torque multiplying phase of operation, the impeller speed will be greater than the turbine speed. Low pressure oil from the controls 100 is fed into chamber 94 so that the clutch 72 has no appreciable load carrying capacity. However, plate 80 is turned by the front cover to move pin 86 to the FIG. 2 position in which the lateral passage 96 is blocked by the wall of the turbine hub. With lateral passage 96 effectively blocked, the chamber 94 is sealed from he converter chamber 18. In the event that mechanical drive through the clutch 72 and drive pin 86 is desired for an all mechanical drive, the back pressure in chamber 94 is reduced so that the capacity of the clutch is accordingly increased. With the force of the transmission fluid in chamber 18 effecting the full drive engagement of clutch 72, the impeller and turbine are drivingly connected together for this drive.

In a transition from an engine drive condition to an overrun condition the turbine T and its hub 30 overruns the pump I and the pin 86 connected thereto through the clutch 72 to cause the hub 30 to move relative to the pin 86 to the position shown in FIG. 3. Under these conditions the lateral passage 96 is opened and chamber 94 is thus in communication with the converter chamber 18. This reduces the pressure differential between chamber 94 and converter chamber 18; the torque transmitting capacity of clutch 72 is thus reduced to a point where it does not transmit appreciable torque. With clutch 72 thus effectively disengaged the reversal of backlash in the drive line is absorbed in converter slip and is not transmitted mechanically to the engine. Thus this invention utilizes the reversal of load direction for releasing the clutch to eliminate the mechanical connection from the turbine to the engine to allow the hydraulic fluid within the converter to function as a fluid dampener.

Although only one drive pin 86 and cooperating opening 88 has been shown and described others can be added as needed to strengthen the drive connection between the plate 80 and the turbine hub when clutch 72 is in torque transmitting engagement. One or any number of the pins can have the passage 92 and 96 to provide for the automatic clutch valve of this invention.

The above-described preferred embodiment is illustrative of the invention which may be modified within the scope of the following claims.

We claim:

1. A power transmitting hydrodynamic unit comprising a housing defining a fluid chamber, input rotor means operatively connected to said housing for circulating transmission oil in said unit, output rotor means for receiving oil circulated by said input rotor means and for directing said oil back toward said input rotor means, torque transmitting means operatively connected to said output rotor means for transmitting the torque developed thereon by the circulating oil within said unit, clutch means in said unit selectively engageable to operatively connect said input rotor means with said torque transmitting means, said clutch means forming a clutch control chamber in said unit, drive means operatively connecting said clutch means to said output rotor means, and valve means operatively connected between said clutch means and said output rotor means to establish hydraulic communication between said fluid chamber and said clutch chamber in response to the overrun of said input rotor means by said output rotor means to reduce the load carrying capacity of said clutch and also to seal said chambers from hydraulic communication in response to the overrun of said output rotor means by said input rotor means so that the load carrying capacity of said clutch can be increased.

2. In a hydrodynamic unit comprising a rotatable drive plate and a housing secured thereto to form a torus chamber, input rotor means operatively connected to said housing for rotation therewith to drive transmission oil supplied to said chamber, output rotor means for receiving oil circulated by said input rotor means and for directing circulated oil back toward said input rotor means, selectively engageable clutch means operatively disposed in said torus chamber for mechanically connecting and for disconnecting said input rotor means and said output rotor means, said clutch means having a clutch plate disposed adjacent to said drive plate to form a clutch control chamber, said output rotor means having a hub portion with an enlarged cylindrical opening therein, a drive means supported by said clutch plate which extends into said opening to form a fluid passage therewith, and fluid passage means in said drive means having an opening cooperating with said hub to hydraulically seal said clutch chamber from said torus chamber when said input rotor means rotates faster than said output rotor means so that the oil pressure in said torus chamber can urge said clutch into engagement and further cooperating with said hub to open said clutch chamber to the torus chamber when said output rotor means rotates faster than said input rotor means to provide for the hydraulic communication of said chambers to cause the drive disengagement of said clutch means and the disconnection of the mechanical drive between said input and output rotor means.

3. A power transmitting hydrodynamic unit comprising a rotatable housing defining a fluid chamber for receiving transmission oil, bladed input rotor means operatively connected to said housing for circulating transmission oil within said unit, bladed output rotor means for receiving oil circulated by said input rotor means and for discharging transmission oil in a circuitous path back toward said input rotor means, torque transmitting means for transmitting torque developed by said output rotor means from the oil circulated thereto by said input rotor means, connector means for drivingly securing said output rotor means to said torque transmitting means, clutch means for mechanically connecting and for disconnecting said input rotor means and said output rotor means, said clutch means comprising clutch plate means operatively disposed within said housing and cooperating directly therewith to define a clutch control chamber separate from said fluid chamber, valve means operatively disposed between said plate means and said output rotor means and responsive to the back drive of said output rotor means by said torque transmitting means to hydraulically connect said clutch control chamber and said fluid chamber so that said clutch means disconnects said input rotor means and output rotor means and being further responsive to the drive of said torque transmitting means by said output rotor means to hydraulically block communication between said clutch control chamber and said fluid chamber so that said clutch means can be engaged to drivingly connect said input rotor means and said output rotor means.

4. The power transmitting unit of claim 3, said unit having a bladed stator therein operatively disposed between said input and output rotor means, a one-way brake for holding said stator from rotating in a first direction and permitting the rotation thereof in an opposite direction, said output rotor means having a hub fastened by said connector means to said torque transmitting means, said valve means comprising drive pin means extending from said plate means into said hub, said hub having opening means for receiving said drive pin means with clearance therebetween that forms an oil passage leading from said fluid chamber, and fluid passage means in said pin means communicating with said clutch control chamber which cooperates with said opening means to seal said chambers from hydraulic communication in a first condition of operation of said unit and to hydraulically connect said chambers in a second condition of operation of said unit.

5. In a hydrodynamic unit having a housing, a rotatable drive plate operatively connected to said housing to form a torus chamber therewith, input and output rotor means disposed in said torus chamber, said input rotor means operatively connected to said housing for rotation therewith, clutch means selectively engageable with said drive plate to selectively drivingly connect said input and output rotor means, said clutch means being operatively disposed in said torus chamber and having a clutch plate cooperating with said drive plate to form a clutch chamber separate from said torus chamber, said output rotor means having a hub portion with an opening formed therein, drive means supported by said clutch plate which extends into said opening in said hub portion for driving said output rotor means when said clutch means is drivingly engaged, and fluid passage means in said drive means for providing for hydraulic communication between said torus chamber and said clutch chamber to cause the drive disengagement of said clutch means in a first position of said drive means relative to said opening and to seal said chambers in a second position of said drive member relative to said opening so that said clutch means can be drivingly engaged with said drive plate subsequent to the rotation of said input rotor faster than said output rotor means.

* * * * *